United States Patent [19]
Yamada et al.

[11] Patent Number: 5,622,408
[45] Date of Patent: Apr. 22, 1997

[54] SEAT RECLINING APPARATUS FOR A VEHICLE

[75] Inventors: Yukifumi Yamada, Toyota; Hiroyuki Okazaki, Chiryu, both of Japan

[73] Assignee: Aisin Seiki Kabushiki Kaisha, Japan

[21] Appl. No.: 341,984

[22] Filed: Nov. 16, 1994

[30]     Foreign Application Priority Data

Nov. 19, 1993  [JP]  Japan ................................. 5-290489

[51] Int. Cl.$^6$ ........................... B60N 2/20; B60N 2/22
[52] U.S. Cl. ....................... 297/367; 297/363; 297/365
[58] Field of Search .................................. 297/365, 366, 297/363, 367

[56]             References Cited

U.S. PATENT DOCUMENTS

| | | | |
|---|---|---|---|
| 4,087,885 | 5/1978 | Gillentine | 297/367 |
| 4,502,730 | 3/1985 | Kazaoka et al. | 297/366 |
| 4,523,786 | 6/1985 | Letournoux et al. | |
| 4,591,207 | 5/1986 | Nithammer et al. | 297/366 |
| 4,659,146 | 4/1987 | Janiaud | 297/365 |
| 4,709,965 | 12/1987 | Kazaoka et al. | 297/366 |
| 4,736,986 | 4/1988 | Kato et al. | 297/366 |

FOREIGN PATENT DOCUMENTS

| | | |
|---|---|---|
| 2364755 | 8/1974 | Germany . |
| 59-34211 | 2/1984 | Japan . |
| 5-60924 | 9/1993 | Japan . |
| 2255151 | 10/1992 | United Kingdom . |

OTHER PUBLICATIONS

German Official letter dated Apr. 24, 1995.
English Translation.

*Primary Examiner*—Peter M. Cuomo
*Assistant Examiner*—Anthony D. Barfield
*Attorney, Agent, or Firm*—Finnegan, Henderson, Farabow, Garrett & Dunner, L.L.P.

[57]             ABSTRACT

The present invention is directed to a seat reclining apparatus for a vehicle having a seat cushion and a seat back pivotally hinged thereto. A lower arm is secured to the seat cushion, while an upper arm is secured to the seat back. The lower arm and upper arm are rotatably mounted on a rotating shaft. A load sustaining mechanism is provided between the lower arm and the upper arm, and sustains a reaction force which is caused to be applied to the rotating shaft when the locking mechanism restrains the rotation of the upper arm relative to the lower arm. The load sustaining mechanism may comprise an arcuate protruding portion formed on the lower arm, and an arcuate groove formed on the upper arm for receiving the protruding portion.

12 Claims, 7 Drawing Sheets

SEAT RECLINING APPARATUS FOR A VEHICLE

BACKGROUND OF THE INVENTION

1. Field of the Invention

The present invention relates to a seat reclining apparatus for a vehicle, more particularly to a vehicle having a seat cushion and a seat back which is hinged to the seat cushion by a lower arm secured to the seat cushion and an upper arm secured to the seat back.

2. Description of the Prior Art

In Japanese Patent Laid-open Publication No. 59-34211, which corresponds to U.S. Pat. No. 4,523,786, there is disclosed a hinge device for seat-backs for adjusting the slope of the backs and locking them in their adjusted positions. The device has a pair of flanges fixed to the framework of the sitting portion of the seat (or, seat cushion) and the framework of the seat back, which are generally called as a lower arm and an upper arm, respectively, and the flanges are rotatably mounted on a shaft. Between the flanges, i.e. the lower arm and the upper arm, provided is a locking mechanism which has a toothed bolt (or, pawl) and an inwardly toothed sector (or, ratchet), and also provided is an unlocking mechanism which has a cam connected to a control hand-lever and adapted to coact with the bolt. In this prior device, the rotation of the upper arm relative to the lower arm is restrained, with the bolt (or, pawl) and the sector (or, ratchet) meshed with each other, while the rotation of the upper arm relative to the lower arm is allowed, with the engagement of the bolt (or, pawl) and the sector (or, ratchet) released from each other by manipulating the hand-lever.

According to the above-described prior device, however, when such load as to rotate the upper arm, in the condition, where the rotation of the upper arm relative to the lower arm has been restrained, is applied to the upper arm, its reaction force from the upper arm acts on the shaft. As a result, the hand-lever is loaded by the reaction force, and therefore the operability might be deteriorated.

SUMMARY OF THE INVENTION

Accordingly, it is an object of the present invention to provide a seat reclining apparatus having a lower arm and an upper arm hinged thereto with a load sustaining mechanism to improve the operability of a rotating shaft for mounting thereon the lower arm and the upper arm rotatably.

In accomplishing the above and other objects, a seat reclining apparatus according to the present invention comprises a lower arm which is secured to a seat cushion, and an upper arm which is secured to a seat back in parallel with the lower arm. The upper arm and lower arm are mounted on a rotating shaft rotatably therearound, and the upper arm and the lower arm are rotatable relative to each other. A locking mechanism is provided between the lower arm and the upper arm for restraining the relative rotation between the lower arm and the upper arm. The locking mechanism includes a pawl which is guided in a radial direction from the rotating shaft and slidably supported between the lower arm and the upper arm, and a ratchet which is provided on one of the lower arm and the upper arm so as to be meshed with the pawl in response to sliding movement of the pawl. An unlocking mechanism is provided for moving the pawl away from the ratchet thereby to allow the lower arm and the upper arm to rotate relative to each other. Then, a load sustaining mechanism is provided for sustaining a reaction force which is caused to be applied to the rotating shaft when the locking mechanism restrains the relative rotation between the lower arm and the upper arm.

The seat reclining apparatus may further comprise a cam mounted on the rotating shaft for moving the pawl toward the ratchet or away from the ratchet in accordance with the rotational direction of the rotating shaft.

Preferably, the load sustaining mechanism comprises a protruding portion which is provided on one of the lower arm and the upper arm, and which is arcuate in shape, with the center of the arc being the center of the rotating shaft, and a groove which is provided on the other one of the lower arm and the upper arm for slidably receiving the protruding portion. When the load sustaining mechanism is assembled, a clearance is defined between the rotating shaft and the upper arm.

The load sustaining mechanism may comprise a bush member which is mounted on the rotating shaft for supporting the lower arm and the upper arm rotatably around the bush member, and a release lever which is fixed to the rotating shaft, and which is arranged to engage the cam for moving the pawl toward the ratchet in accordance with a rotational direction of the rotating shaft, and arranged to engage the pawl for moving the pawl away from the ratchet in accordance with the rotational direction of the rotating shaft opposite to the rotational direction thereof for moving the pawl toward the ratchet.

The load sustaining mechanism may comprise a holding member which is secured to the lower arm and rotatably mounted around the rotating shaft. It is so arranged that a clearance is defined between the rotating shaft and the upper arm, when the load sustaining mechanism is assembled, and that the holding member holds the upper arm to restrain the movement thereof in the radial direction from the rotating shaft opposite to the pawl.

BRIEF DESCRIPTION OF THE DRAWINGS

The above stated object and following description will become readily apparent with reference to the accompanying drawings in which.

DESCRIPTION OF THE PREFERRED EMBODIMENT

Figure 1:
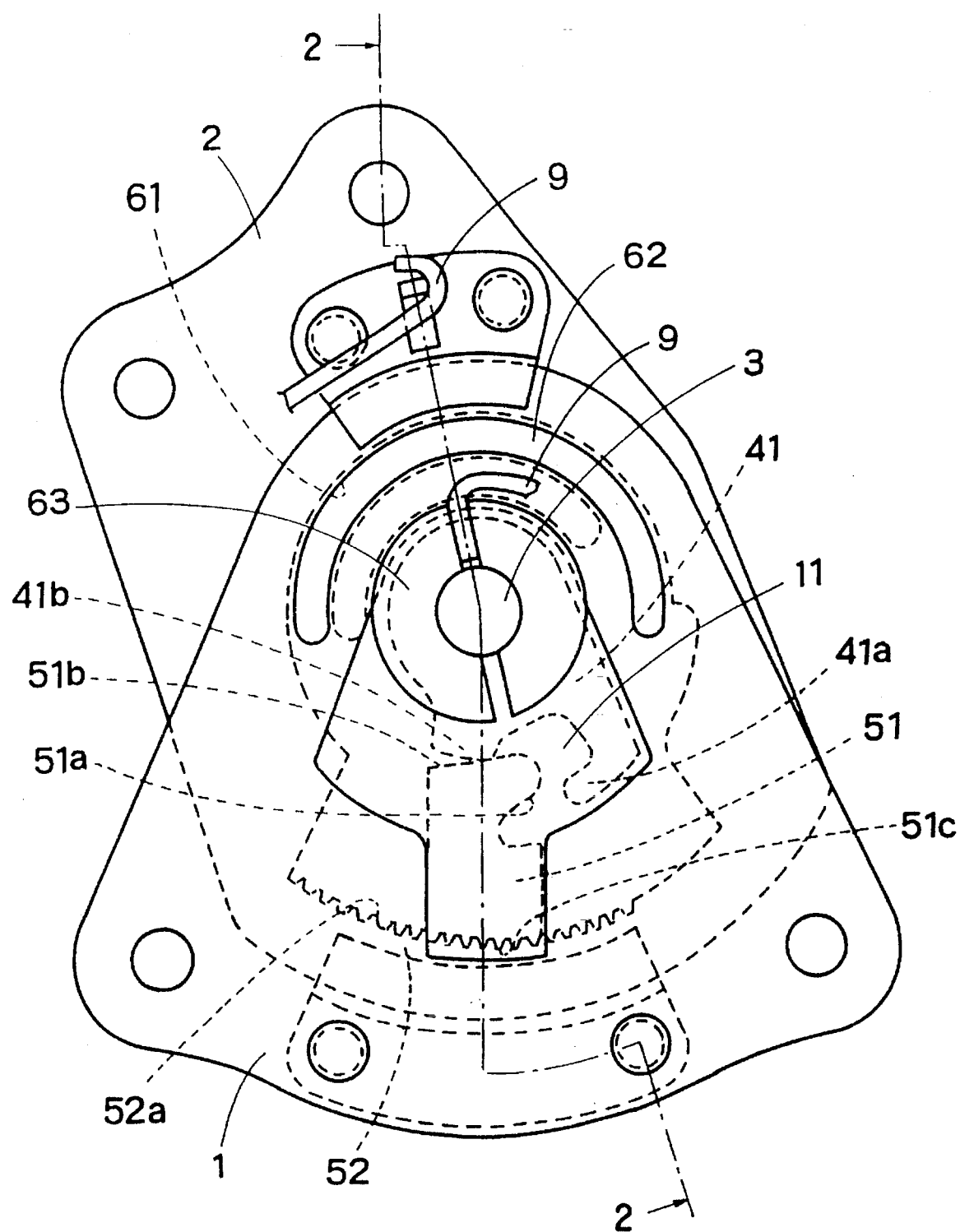
FIG. 1 is a plan view of a seat reclining apparatus according to a first embodiment of the present invention.
Figure 2:
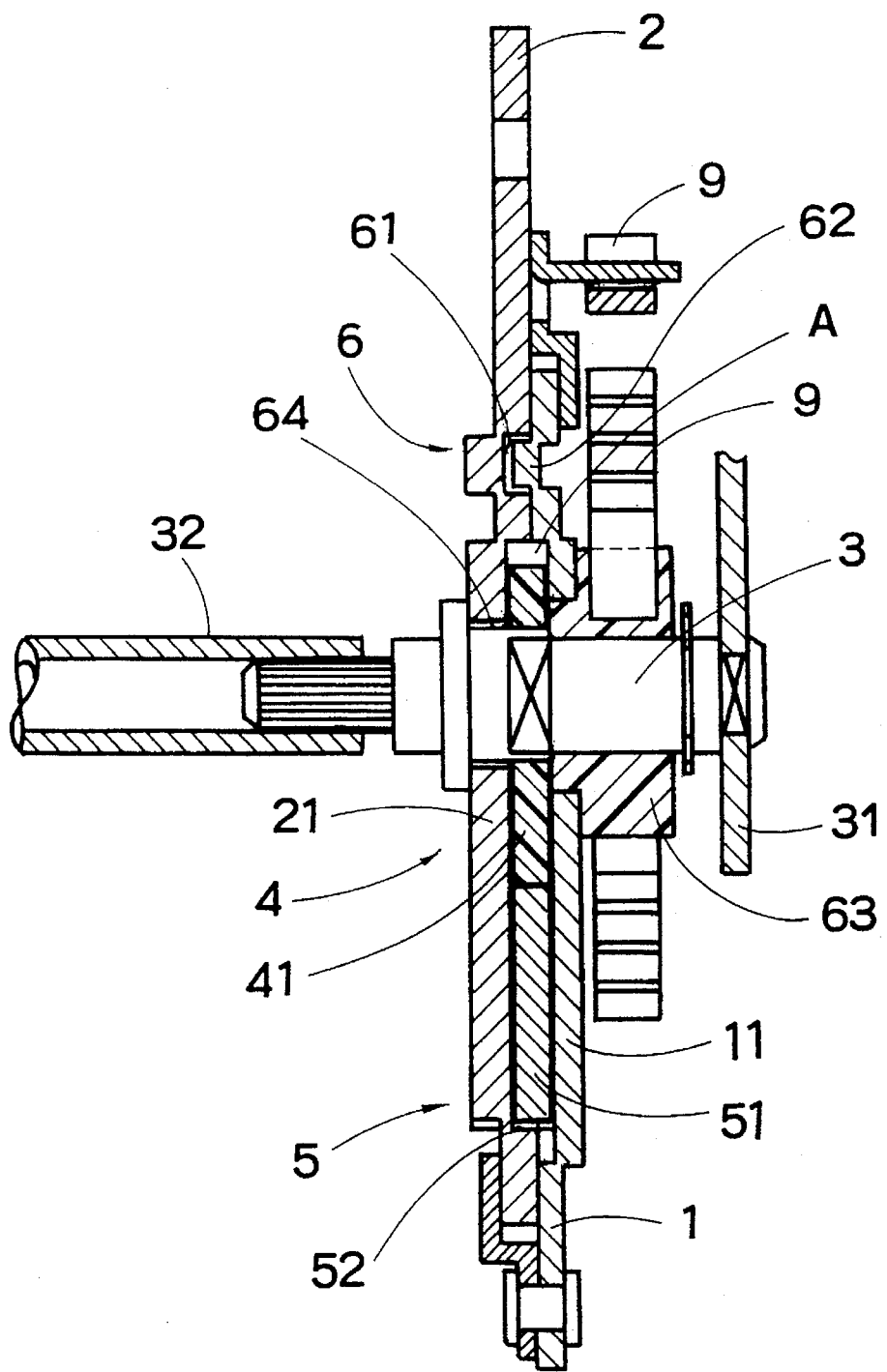
FIG. 2 is a sectional view taken along line 2—2 in FIG. 1.
Figure 7:
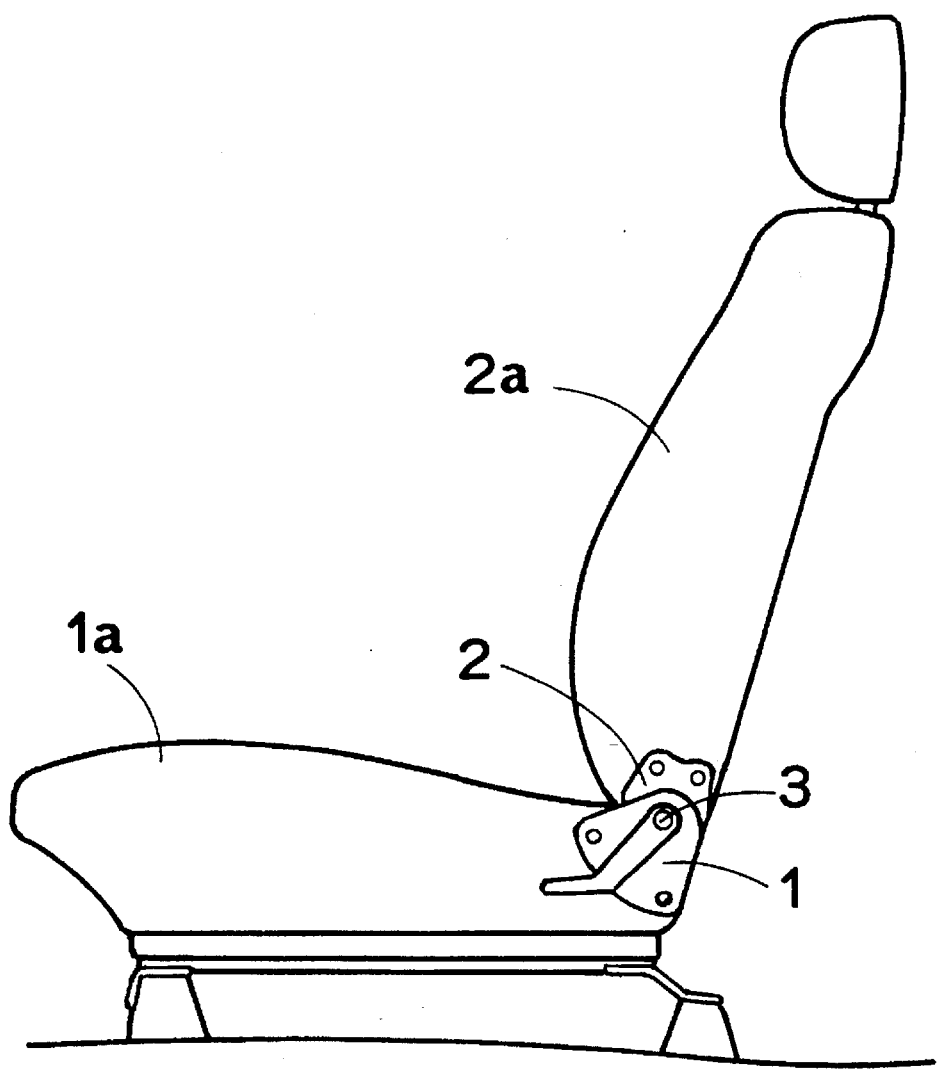
FIG. 7 is a side view of a seat provided with a seat reclining apparatus according to an embodiment of the present invention.

Referring to FIGS. 1 and 2, a seat reclining apparatus for a vehicle according to an embodiment of the present invention includes a lower arm 1 which is secured to a seat cushion 1a as shown in FIG. 7 and an upper arm 2 which is secured to a seat back 2a as shown in FIG. 7. These lower and upper arms 1 and 2 are rotatably mounted on a rotating shaft 3, so that the upper arm 2 can be rotated relative to the lower arm 1. The lower arm 1 and upper arm 2 are partially deformed in dish-like shape to define a space A as shown in FIG.2 between the lower arm 1 and the upper arm 2, and to provide supporting portions 11, 21 for supporting the rotating shaft 3. In this space A are disposed a cam 41 to provide an unlocking mechanism 4, and a pawl 51 and a ratchet 52 to provide a locking mechanism 5.

The cam 41 is provided with a dog-leg portion 41a and a boss 41b extending from its peripheral surface, and secured to the rotating shaft 3 at its center so as to be rotated together with the rotating shaft 3 about the axis thereof. The ratchet 52 has a toothed portion 52a which is formed integral with the upper arm 2 and inside of the deformed portion of the upper arm 2 to be arcuate in shape as a whole, with the center of the arc being the center of the rotating shaft 3. The pawl 51 is provided with a toothed portion 51c which is formed on one end of the pawl 51, a back 51b which is formed on the other end of the pawl 51 opposite to the toothed portion 51c for providing a cam surface which faces the boss 41b of the cam 41, and a recess 51a which is formed on a lateral side of the pawl 51 for providing a cam surface to engage the dog-leg portion 41a of the cam 41.

The pawl 51 is disposed between the cam 41 and the ratchet 52 within the space A as shown in FIG. 2, and supported by the lower arm 1 to be slidable in a radial direction from the rotating shaft 3. That is, the pawl 51 is fitted into a recess having parallel edges which are formed on the supporting portion 11 of the lower arm 1 in a radial direction from the rotating shaft 3, so that the pawl 51 is guided by the edges at its opposite lateral sides, and guided by the lower arm 1 and the upper arm 2 at its remaining opposite lateral sides. The dog-leg portion 41a is arranged to engage or disengage the recess 51a of the pawl 51 in accordance with a rotational direction of the cam 41. The boss 41b is arranged to contact the back 51b in accordance with rotation of the cam 41, so that the toothed portion 51c of the pawl 51 can engage the toothed portion 52a of the ratchet 52.

According to the present embodiment, when the pawl 51 is held in a meshed relationship with the ratchet 52, the upper arm 2 is restrained from being rotated relative to the lower arm 1. When the rotating shaft 3 is manipulated to rotate clockwise in FIG. 1, the cam 41 rotates with the rotating shaft 3 clockwise in FIG. 1, and the dog-leg portion 41a of the cam 41 comes into engagement with the recess 51a of the pawl 51. Consequently, the pawl 51 is moved away from the ratchet 52, so that the meshed engagement between the pawl 51 and the ratchet 52 is released thereby to allow the upper arm 2 to rotate relative to the lower arm 1. When the rotating shaft 3 is manipulated to rotate in the reverse direction to the aforementioned direction, the boss 41b of the cam 41 contacts the back 51a of the pawl 51 to push the pawl 51 toward the ratchet 52. As a result, the pawl 51 is meshed with the ratchet 52 to restrain the upper arm 2 from rotating relative to the lower arm 1.

The above-described structure is provided at both lateral sides of the seat cushion and seat back, and further includes a control handle 31 which is fixed to an outer end (right end in FIG. 2) of the rotating shaft 3 at one side of the seat, while the inner end (left end in FIG. 2) of the rotating shaft 3 is connected with a rotating shaft at the other side of the seat (not shown) through a connecting rod 32.

A load sustaining mechanism 6 according to a first embodiment of the present invention will be explained hereinafter. As shown in FIGS. 1 and 2, the upper arm 2 is partially stamped to form a groove 61 which is arcuate with the center of the arc being the center of the rotating shaft 3, and both ends of which lead to the space A. Also, the lower arm 1 is partially stamped to form a protruding portion 62 which is arcuate with the center of the arc being the center of the rotating shaft 3. The groove 61 and protruding portion 62 are arranged in such a manner that the protruding portion 62 is received in the groove 61 so as to contact each other at the upper and lower side-surfaces as shown in FIG. 1. In order to prevent the load from being applied to the rotating shaft 3, a bush 63 is fixedly provided on the lower arm 1 and rotatably mounted on the rotating shaft 3, and a clearance 64 is defined between the upper arm 2 and the rotating shaft 3. The bush 63 is provided between the upper arm 2 and the lower arm 1, and serves also as a member for securing a spiral spring 9 to the lower arm 1, so as to bias the upper arm 2 relative to the lower arm 1 in the counterclockwise direction in FIG. 1.

According to the first embodiment as constituted above, when such load as to rotate the upper arm 2, in the condition where the rotation of the upper arm 2, relative to the lower arm 1 has been restrained, is applied to the upper arm 2, the load is sustained through the meshed engagement between the pawl 51 and the ratchet 52, while its reaction force is sustained through the contact between the groove 61 and the protruding portion 62. Therefore, such load as to rotate the upper arm 2 in the condition where the rotation of the upper arm 2 relative to the lower arm 1 has been restrained is transmitted to the lower arm 1 without being transmitted thereto through the rotating shaft 3. Consequently, the ability to manipulate the rotation of the rotating shaft 3 is always kept in good condition, and the operability does not deteriorate.

Figure 3:
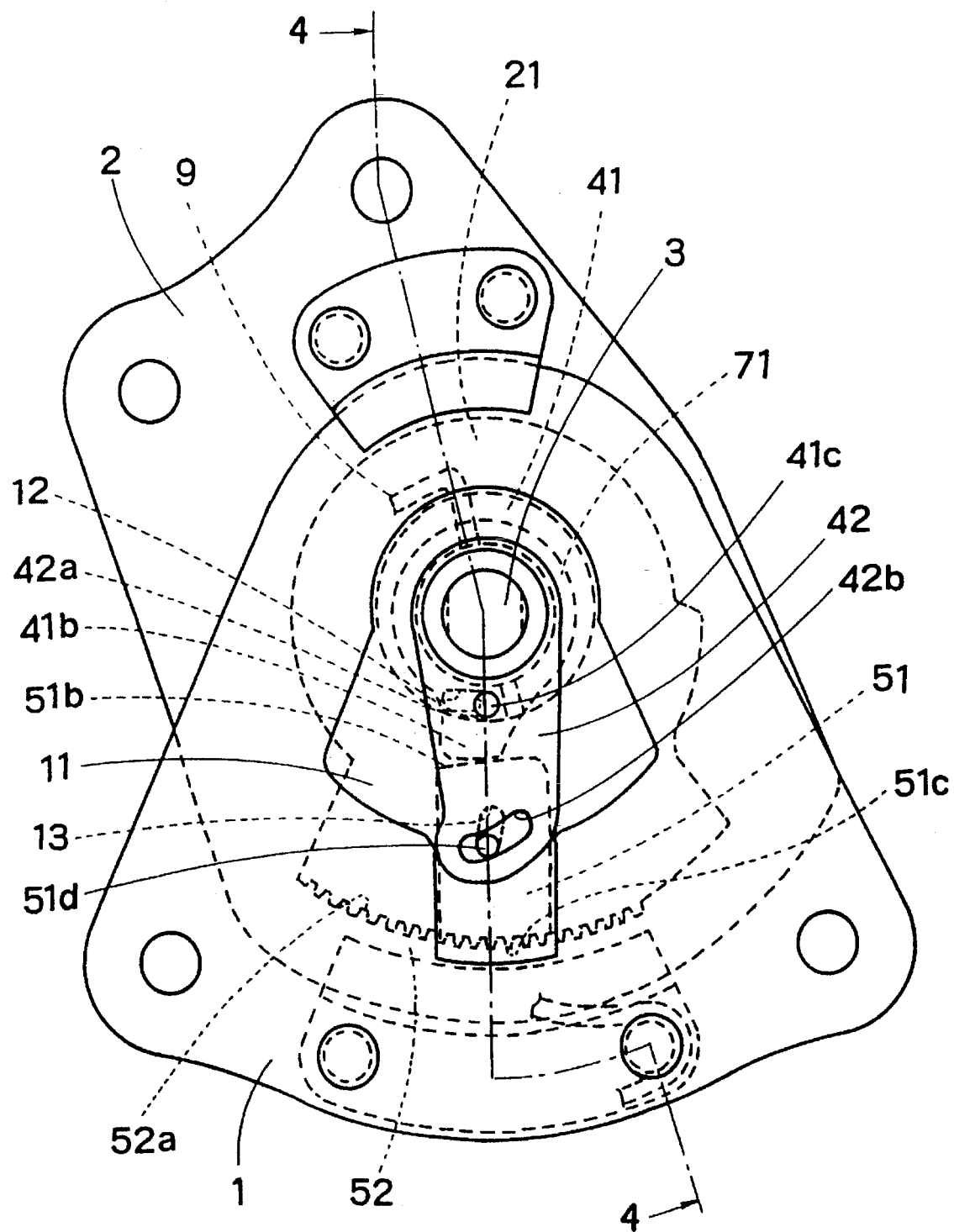
FIG. 3 is a plan view of a seat reclining apparatus according to a second embodiment of the present invention.
Figure 4:
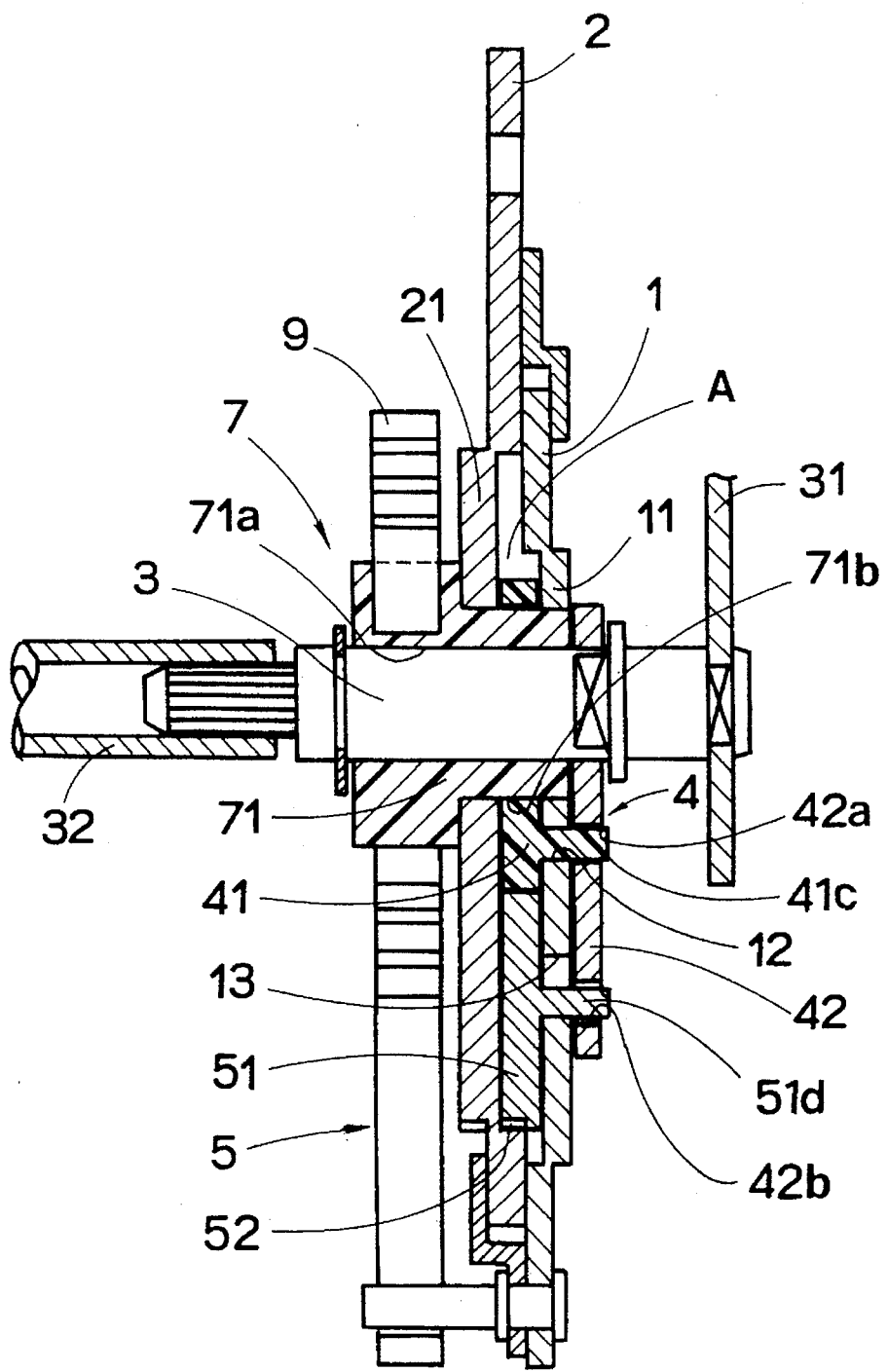
FIG. 4 is a sectional view taken along line 4—4 in FIG.3.

A load sustaining mechanism 7 according to a second embodiment of the present invention will be explained hereinafter. As shown in FIGS. 3 and 4, a bush 71 is provided between the rotating shaft 3 and the upper arm 2, and between the shaft 3 and the lower arm 1, supporting the rotating shaft 3 rotatably on its inner surface 71a, and supporting the supporting portions 11, 21 of the lower arm 1 and the upper arm 2 on its outer surface 71b. The bush 71 is secured to the supporting portion 21 of the upper arm 2. The bush 71 serves also as a member for securing a spiral spring 9 to the upper arm 2, so as to bias the upper arm 2 relative to the lower arm 1 in the counterclockwise direction in FIG. 3.

Since the cam 41 is arranged to be supported by the bush 71 in this embodiment, it is unable to secure the cam 41 to the rotating shaft 3. Therefore, it is so arranged that the cam 41 engages the rotating shaft 3 through a release lever 42 which is secured to the rotating shaft 3 so as to rotate together therewith. The cam 41 engages the release lever 42 through a protruding pin 41c which is mounted on the cam 41, and which is received in a hole 42a defined in the release lever 42, through an elongated hole 12 which is defined in the lower arm 1. Furthermore, as shown in FIGS. 3 and 4, a protruding pin 51d is mounted on the pawl 51 and inserted into a cam slit 42b which is defined in the release lever 42, through an elongated hole 13 defined in the lower arm 1. With the release lever 42 rotated by the rotating shaft 3, the pawl 51 can be moved radially in accordance with rotation of the rotating shaft 3.

According to the second embodiment as constituted above, when such load as to rotate the upper arm 2 in the condition, where the rotation of the upper arm 2 relative to the lower arm 1 has been restrained, is applied to the upper arm 2, the load is sustained through the meshed engagement between the pawl 51 and the ratchet 52, while its reaction force is sustained by the bush 71. Therefore, such load as to rotate the upper arm 2 in the condition where the rotation of the upper arm 2 relative to the lower arm 1 has been restrained is transmitted to the lower arm 1 without being transmitted thereto through the rotating shaft 3. Consequently, the rotating manipulation of the rotating shaft 3 is always kept in good condition, and the operability does not deteriorate.

Figure 5:
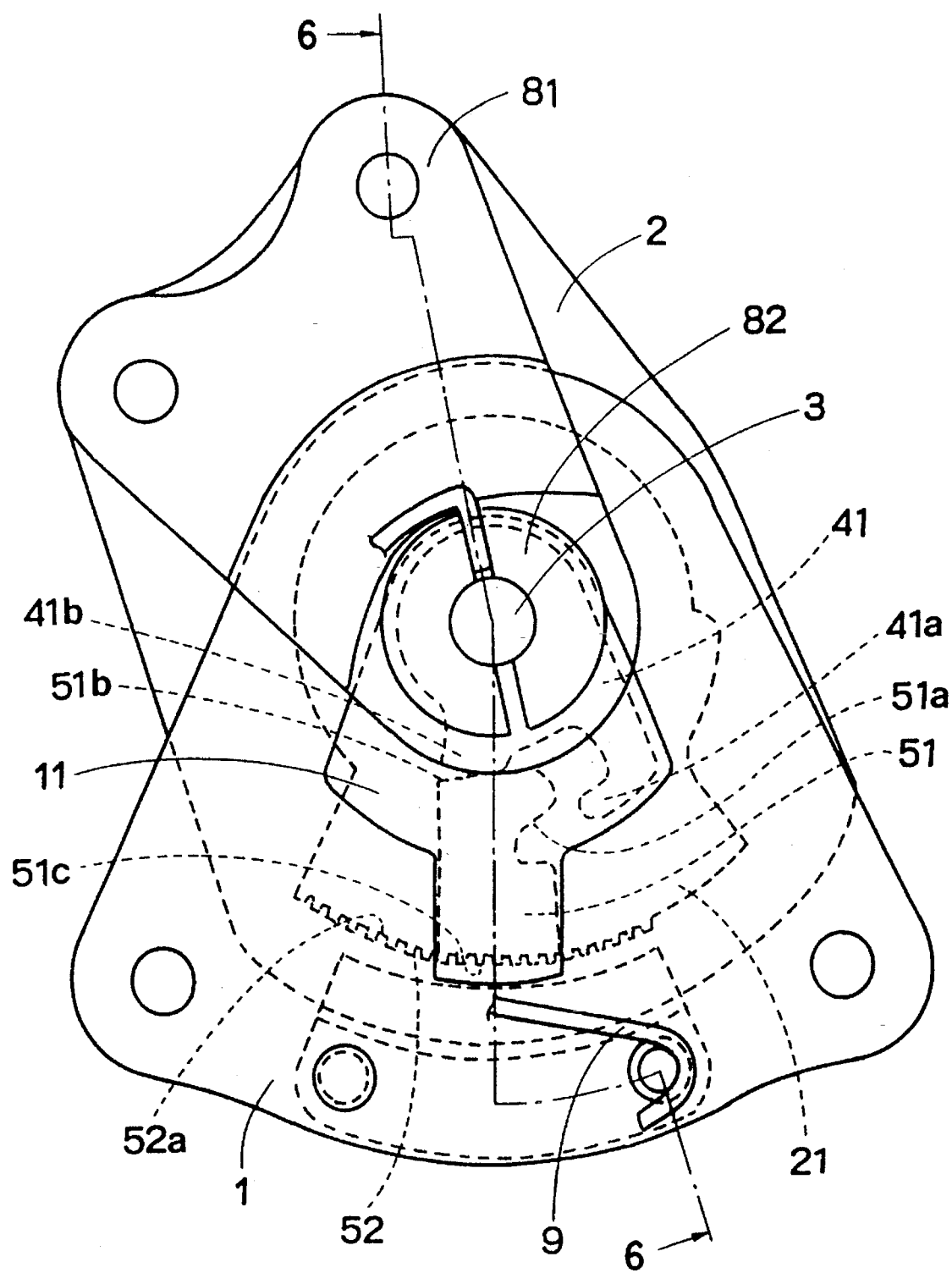
FIG. 5 is a plan view of a seat reclining apparatus according to a third embodiment of the present invention.
Figure 6:
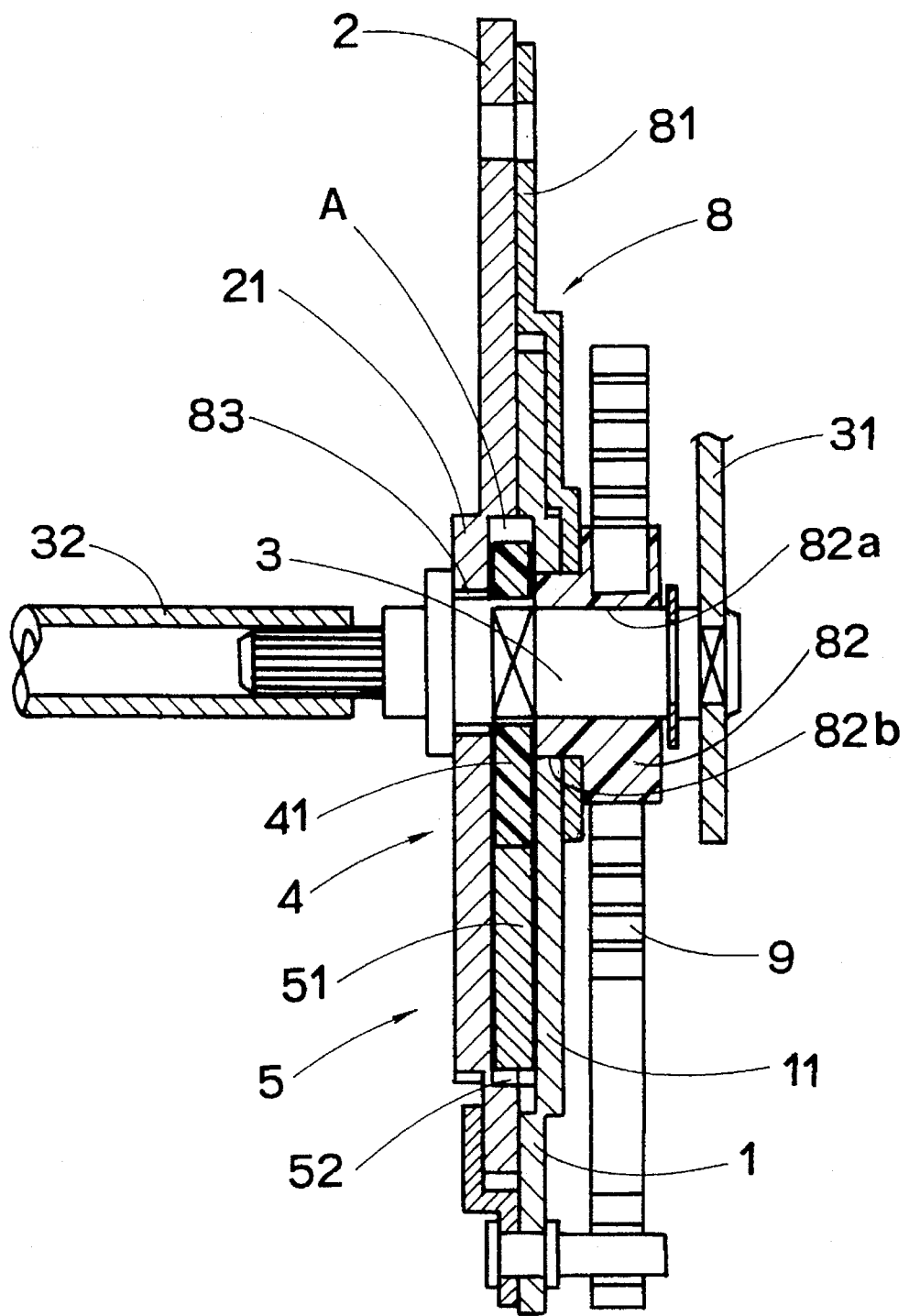
FIG. 6 is a sectional view taken along line 6—6 in FIG. 5.

A load sustaining mechanism 8 according to a third embodiment of the present invention will be explained hereinafter. As shown in FIGS. 5 and 6, a sub-plate 81, which serves as a holding member according to the present invention, is secured to the upper arm 2, and a bush 82 is secured to the sub-plate 81. The rotating shaft 3 is rotatably supported on the inner surface 82a of the bush 82, and the supporting portion 11 of the lower arm 1 is supported on the outer surface 82b of the bush 82. In order to prevent the load from being applied to the rotating shaft 3, a clearance 83 is defined between the upper arm 2 and the rotating shaft 3. The bush 82 serves also as a member for securing a spiral spring 9 to the lower arm 1, so as to bias the upper arm 2 relative to the lower arm 1 in the counterclockwise direction in FIG.5. In the case where it is unnecessary to secure the spiral spring 9 to the bush 82, however, the bush 82 may be formed integral with the sub-plate 81.

According to this third embodiment, when such load as to rotate the upper arm 2 in the condition, where the rotation of the upper arm 2 relative to the lower arm 1 has been restrained, is applied to the upper arm 2, the load is sustained through the meshed engagement between the pawl 51 and the ratchet 52, while its reaction force is sustained by the bush 82 through the sub-plate 81. Therefore, such load as to rotate the upper arm 2 in the condition where the rotation of the upper arm 2 relative to the lower arm 1 has been restrained is transmitted to the lower arm 1 without being transmitted thereto through the rotating shaft 3. Consequently, the rotating manipulation of the rotating shaft 3 is always kept in good condition, and the operability does not deteriorate.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A seat reclining apparatus for use in a vehicle having a seat cushion and a seat back pivotally hinged thereto, comprising:

a lower arm adapted to be secured to said seat cushion;

an upper arm adapted to be secured to said seat back;

a rotating shaft for mounting thereon said upper arm and said lower arm rotatably about said rotating shaft, said upper arm and said lower arm being rotatable relative to each other;

a control handle rigidly secured to said rotating shaft for rotation thereof;

a locking mechanism provided between said lower arm and said upper arm for restraining the relative rotation between said lower arm and said upper arm, said locking mechanism having a pawl guided in a radial direction from said rotating shaft and slidably supported between said lower arm and said upper arm, and a ratchet provided on one of said lower arm and said upper arm to be meshed with said pawl in response to sliding movement of said pawl;

an unlocking mechanism responsive to the rotation of the shaft for moving said pawl away from said ratchet to allow said lower arm and said upper arm to rotate relative to each other; and a load sustaining mechanism provided between said lower arm and said upper arm for sustaining a reaction force which is caused to be applied to said rotating shaft when said locking mechanism restrains the relative rotation between said lower arm and said upper arm.

2. A seat reclining apparatus according to claim 1, wherein said unlocking mechanism includes a cam mounted on said rotating shaft for moving said pawl toward said ratchet or away from said ratchet in accordance with the rotational direction of said rotating shaft.

3. A seat reclining apparatus according to claim 2, wherein said lower arm comprises a first plate formed with a first recess and said upper arm comprises a second plate formed with a second recess, and wherein said first plate and second plate are connected in parallel with each other to provide a space for embracing said locking mechanism and said unlocking mechanism between said first recess and said second recess.

4. A seat reclining apparatus for a vehicle according to claim 2, wherein said load sustaining mechanism comprises;

a bush member mounted on said rotating shaft for supporting said lower arm and said upper arm rotatably around said bush member; and a release lever fixed to said rotating shaft, said release lever engaging said cam for moving said pawl toward said ratchet in accordance with a rotational direction of said rotating shaft, and engaging said pawl for moving said pawl away from said ratchet in accordance with the rotational direction of said rotating shaft opposite to the rotational direction thereof for moving said pawl toward said ratchet.

5. A seat reclining apparatus for a vehicle according to claim 4, wherein said pawl is provided with a pin protruding from said pawl, and wherein said release lever is formed with a cam slit in which said pin is received.

6. A seat reclining apparatus according to claim 1, wherein said rotating shaft has a center and said load sustaining mechanism comprises:

a protruding portion provided on one of said lower arm and said upper arm, said protruding portion being arcuate in shape with a center which is coincident with the center of said rotating shaft; and a groove provided on the other one of said lower arm and said upper arm for slidably receiving said protruding portion, and wherein a clearance is defined between said rotating shaft and said upper arm.

7. A seat reclining apparatus according to claim 6, wherein said load sustaining mechanism further comprises a bush mounted on said rotating shaft for supporting said lower arm.

8. A seat reclining apparatus for a vehicle according to claim 1, wherein said load sustaining mechanism comprises a holding member secured to said lower arm and rotatably mounted around said rotating shaft, and wherein a clearance is defined between said rotating shaft and said upper arm, and said holding member holds said upper arm to restrain the movement thereof in the radial direction from said rotating shaft opposite to said pawl.

9. A seat reclining apparatus for a vehicle according to claim 8, wherein said load sustaining mechanism further comprises a bush mounted on said rotating shaft for supporting said holding member.

10. A seat reclining apparatus for a vehicle according to claim 9, wherein said bush is formed integral with said holding member.

11. A seat reclining apparatus for use with a seat cushion and a pivoting seat back, comprising:

- a lower arm adapted to be secured to the seat cushion and an upper arm adapted to be secured to the seat back;
- a shaft for mounting thereon the upper arm and the lower arm relative to each other rotatably about the axis of the shaft;
- a control handle rigidly mounted on the shaft for rotation thereof;
- locking means for preventing relative movement between the lower and upper arms, the locking means provided between the lower and upper arms and operable by the shaft, the locking means having a ratchet provided on one of the lower arm and upper arm and having a pawl slidably supported between the lower and upper arms, the pawl being adapted to be meshed with the ratchet so as to prevent the relative movement between the lower and upper arms;
- unlocking means responsive to the rotation of the shaft for disengaging the pawl from the ratchet;
- a load sustaining means provided between the lower arm and the upper arm for sustaining a reaction force which is prevented from being applied to the shaft when the locking mechanism is in mesh.

12. A seat reclining apparatus according to claim 11, wherein said load sustaining means comprises:

- a protruding portion provided on one of said lower arm and said upper arm, said protruding portion being arcuate in shape with a center which is aligned with the axis of the shaft; and
- a groove provided on the other one of said lower arm and said upper arm for slidably receiving said protruding portion;
- and wherein a clearance is defined between said shaft and said upper arm.

* * * * *